(12) United States Patent
Vakkalagadda et al.

(10) Patent No.: US 6,775,282 B1
(45) Date of Patent: Aug. 10, 2004

(54) BUS COMMUNICATION

(75) Inventors: Ramamohan R. Vakkalagadda, San Jose, CA (US); Venu M. Kuchibhotla, Campbell, CA (US); Michael N. Derr, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/472,858

(22) Filed: Dec. 27, 1999

(51) Int. Cl.$^7$ ............................................. H04L 12/28
(52) U.S. Cl. ...................... 370/392; 370/438; 710/107; 710/313
(58) Field of Search ................................. 370/401, 463, 370/419, 420, 395.1, 469, 421, 389, 392; 710/100, 107, 313

(56) References Cited

U.S. PATENT DOCUMENTS

| | | | | |
|---|---|---|---|---|
| 5,136,580 A | * | 8/1992 | Videlock et al. ............ 370/403 |
| 5,343,471 A | * | 8/1994 | Cassagnol ................... 370/401 |
| 5,396,493 A | * | 3/1995 | Sugiyama ................... 370/403 |
| 5,570,366 A | * | 10/1996 | Baker et al. ................ 370/312 |
| 5,842,003 A | * | 11/1998 | Holmes et al. .............. 703/23 |
| 6,381,652 B1 | * | 4/2002 | Reghunathan ............... 709/250 |
| 6,507,591 B1 | * | 1/2003 | Bray .......................... 370/501 |
| 6,529,511 B1 | * | 3/2003 | Du et al. .................... 370/397 |

* cited by examiner

Primary Examiner—Frank Duong
Assistant Examiner—Melanie Jagannathan
(74) Attorney, Agent, or Firm—Fish & Richardson P.C.

(57) ABSTRACT

An apparatus includes at least two circuits having interfaces, for transmitting and receiving bus formatted messages and a port coupled to receive messages from the interfaces. The port broadcasts a first received message that is not destined for one of the circuits to the bus. The port blocks broadcast of a second received message that is destined for one of the circuits to the bus.

13 Claims, 7 Drawing Sheets

BUS COMMUNICATION

BACKGROUND OF THE INVENTION

This invention relates to bus communication.

A digital device often includes a bus that enables components to communicate with each other. Bus communication between the components may consume a substantial portion of the power available to a device.

SUMMARY OF THE INVENTION

In one aspect, the invention features an apparatus that includes at least two circuits having interfaces for transmitting and receiving bus formatted messages and a port coupled to receive messages from the interfaces. The port broadcasts a first received message that is not destined for one of the circuits to the bus. The port blocks broadcast of a second received message that is destined for one of the circuits to the bus.

Other features and advantages will be appreciated from the following description taken together with the drawings.

DESCRIPTION OF THE EMBODIMENTS

Figure 1:
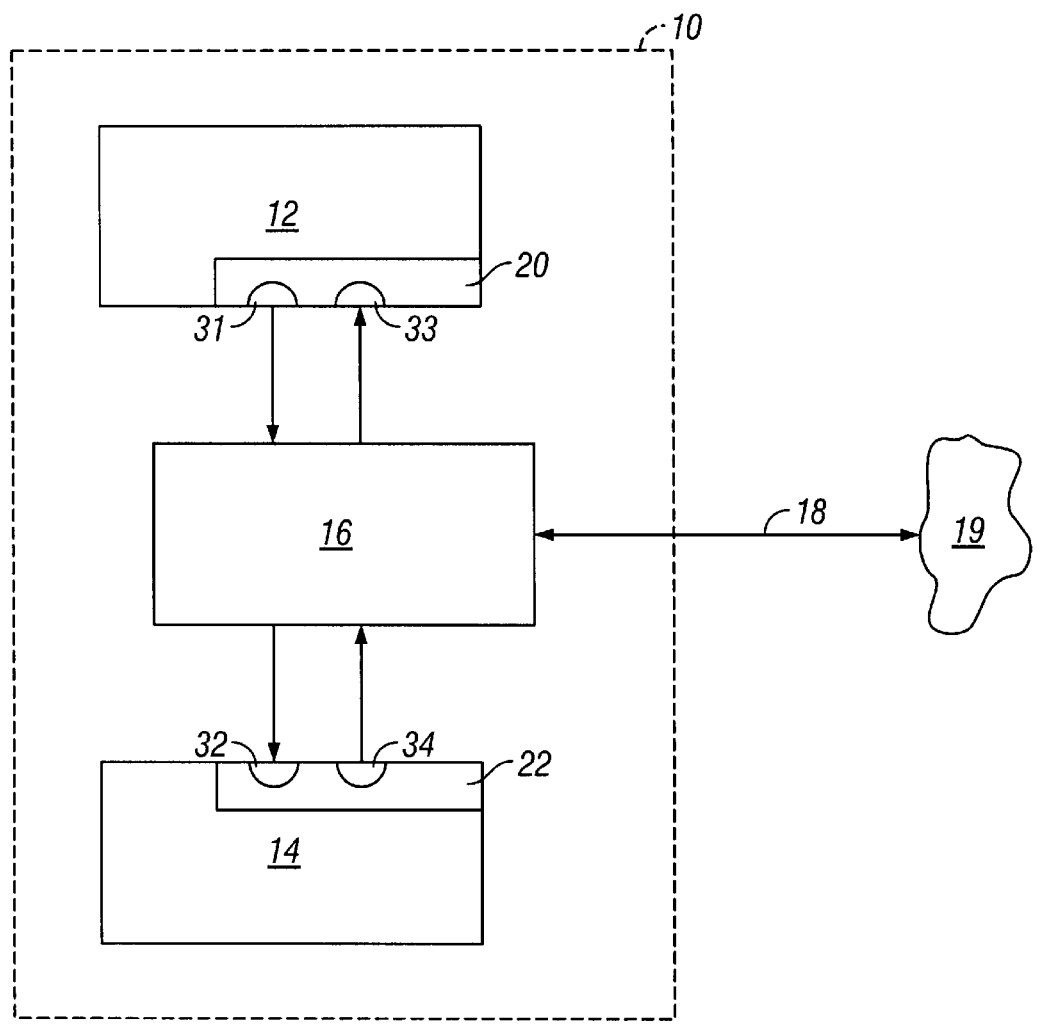
FIG. 1 shows a chip in which two circuits share a port on an external bus.

FIG. 1 shows an integrated chip 10 in which separate circuits 12, 14 share a single communication port 16 to an external bus 18. The circuits 12, 14 communicate with external hardware devices 19 via the port 16 and bus 18 combination. The bus 18 transmits and receives messages according to a selected bus protocol.

In some embodiments, the bus protocol is the Peripheral Component Interconnect (PCI) protocol. This protocol is described in the "PCI Local Bus Specification" maintained by the PCI Special Interest Group, P.O. Box 14070, Portland Oreg. 97214.

Each circuit 12, 14 has an interface 20, 22 capable of both sending and receiving messages formatted in the protocol supported by the external bus 18. Each bus formatted message includes portions for control, address, and data content. The address and data portions of the messages are sent sequentially.

The shared port 16 does not broadcast a message from one of the circuits 12, 14 over the bus 18 if the message has the other circuit 14, 12 sharing the same port 16 as a destination. Instead such messages are sent directly to the other circuit 14, 12 via the shared port 16. For such messages, the port 16 does not toggle the external bus 18. Since the external bus is not toggled, the transmission of such messages uses less power than if messages were communicated over the bus 18.

The port 16 couples to circuits 12, 14 that have interfaces 20, 22 with output terminals 31, 32 and input terminals 33, 34. The interfaces 20, 22 transmit and receive messages according to the protocol of the bus 18. Thus, each interface 20, 22 includes hardware for decoding address and control portions of the messages.

In some embodiments, the circuits 12, 14 are digital bridges that transmit digital bus communications originating from internal buses to the bus 18. Then, each circuit 12, 14 may connect to a different internal bus. For example, the circuit 12 may be a north bridge that couples a bus from a CPU to the bus 18, and the circuit 14 may be a south bridge that couples a second bus from a memory to the bus 18.

Figure 2:
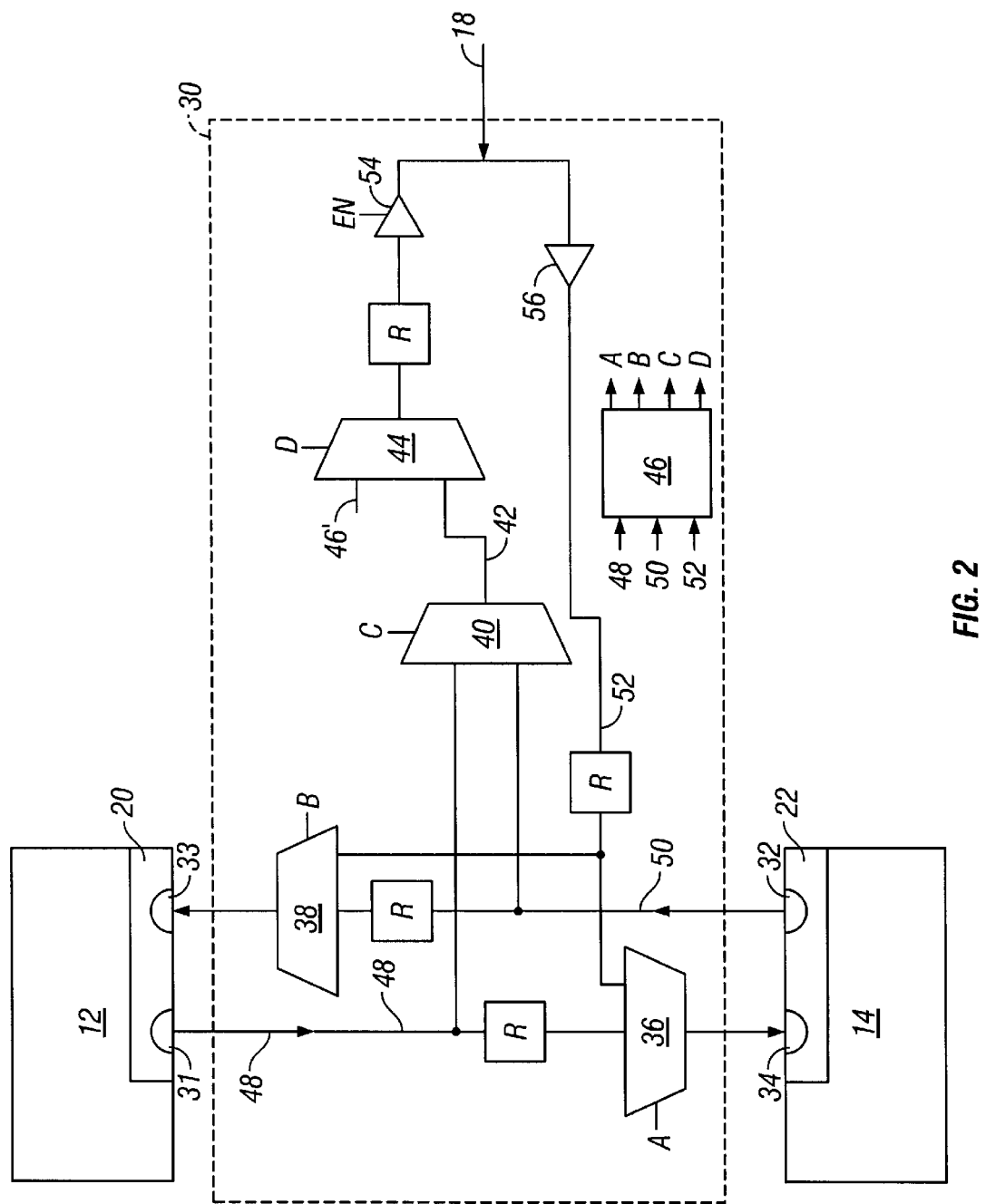
FIG. 2 shows a specific embodiment of the shared port of FIG. 1.

FIG. 2 shows one embodiment 30 of the shared port 16 of FIG. 1 that couples to the interfaces 20, 22. Each interface 20, 22 transmits outgoing messages to an associated pair of multiplexers (MUXes) 36, 38, 40. The MUXes 36, 38 also receive messages from the external bus 18. These MUXes 36, 38 selectively connect either one of the circuits 20, 22 or the external bus 18 to the input terminals 34, 33 of the other circuit 22, 20. The MUX 40 can transmit signals from one circuit 12, 14, at a time. The circuits 12, 14 broadcast messages to the external bus via the MUX 40.

The MUX 40 transmits messages to the bus 18 via a line 42. The line 42 connects to a set of input terminals of a MUX 44. The MUX 44.has a second set of input terminals 46' that receives a constant signal. The constant signal indicates to devices supporting the bus protocol that the port 16 is inactive. At any one time, the MUX 44 is either sending a bus formatted message from one of the circuits 12, 14 or an inactive signal to the external bus 18.

Input terminal selection for the MUXes 36, 38, 40, 44 is controlled by select terminals A, B, C, D. The select terminals A, B, C, D receive control signals from a control module 46. The control module 46 receives address portions of bus formatted messages from the lines 48, 50, 52, prior to arrival of the messages at temporary storage registers R, e.g., parallel banks of digital flip-flops. Each of the lines 48, 50, 52 carries control, address, and data information. Some embodiments do not include the register R on the line 52, because logic of the control module 46 is fast enough to route signals from the line 52 with the register R.

The control module 46 performs destination decoding of the received addresses and transmits select signals responsive to the decoded destinations to select terminals A, B, C, D of the MUXes 36, 38, 40, 44. For example, in response to a message on the line 48 whose destination is an external address, the control module 46 sends signals to terminals C and D to select lines 48 and 42. The control module 46 also sends signals to line B to select line 52 so that messages received back from the bus 18 are routed to the circuit 12. Similarly, in response to a message on the line 48 whose destination address is in the circuit 14, the control module 46 sends a signal to terminal A to select the line 48. At the same time, the control module 46 sends a signal to the terminal B to select line 50 and route data from the circuit 14 back to the circuit 12. The select signals control hardware routing of bus formatted messages to message destinations.

The shared port 30 also has drivers 54, 56 for sending messages to and for receiving messages from the external bus 18. The output driver 54 is an amplifier that toggle bus lines to send digital information. The driver 54 has an enable terminal EN that receives a transmission enable signal. The transmission enable signal of one embodiment is the logical OR of transmission enable signals sent by the interfaces 20, 22 of the two circuits 12, 14.

Figure 3:
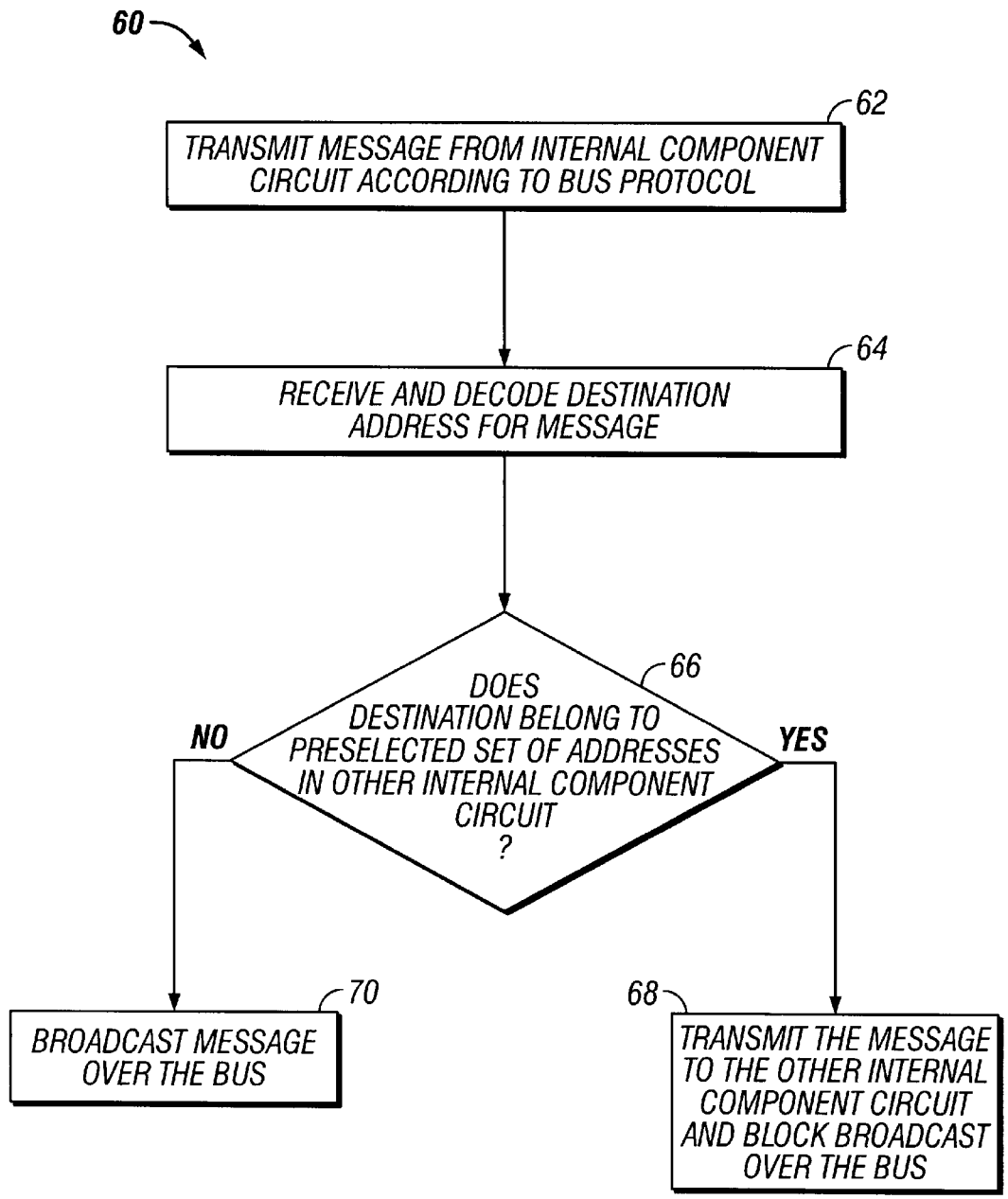
FIG. 3 is a flow chart showing a method of operating the shared port of FIG. 1.

FIG. 3 is a flow chart illustrating a method 60 of one embodiment for transmitting bus formatted messages. Transmission begins when one of internal circuits 12, 14 of FIG. 1 starts to transmit a message according to the bus protocol (step 62). The transmission starts with control and address portions of the message. The control module 46 receives and decodes the destination address for the message (step 64). While destination decoding proceeds, the address portion of the message is stored in a register R connected to the line 48, 50, 52 transmitting the message.

From decoding results, the control module 46 decides whether the destination address belongs to one of the circuits 12, 14 sharing the port 16 (step 66). If the destination belongs to one of the circuits 12, 14, the control module 46 sends signals to the terminal D and to terminal A or B as appropriate (step 68). The signal to the terminal D causes the MUX 44 to block the message from being broadcast on the external bus 18 and also broadcasts a "port inactive" signal over the bus 18. The signal to terminal A or B directs the message to the circuit 12, 14 that is the message's destination. If the destination is not one of the circuits 12, 14, the control module 46 sends signals to terminals C and D that cause the MUXes 40, 44 to broadcast the message on the external bus 18.

In some embodiments, only messages for preselected address ranges in the circuits 12, 14 are not broadcast on the external bus 18. If one of the circuits 12, 14 transmits a message directed to an address outside of the preselected ranges, the port 16 broadcasts the message to the external bus 18. Then, the message is received back from the port 16 and delivered, via the line 52, to the target circuit 12, 14.

Sending such messages via the external bus 18 may enable the control module 46 to employ less address decode hardware. Using less decode hardware can result in a faster and/or less expensive control module 46.

In the shared port 16, the direct delivery of some messages, i.e., without broadcasting on the bus 18, consumes less power, because the output driver 54 does not have to toggle external bus lines to deliver such messages.

Figure 4:
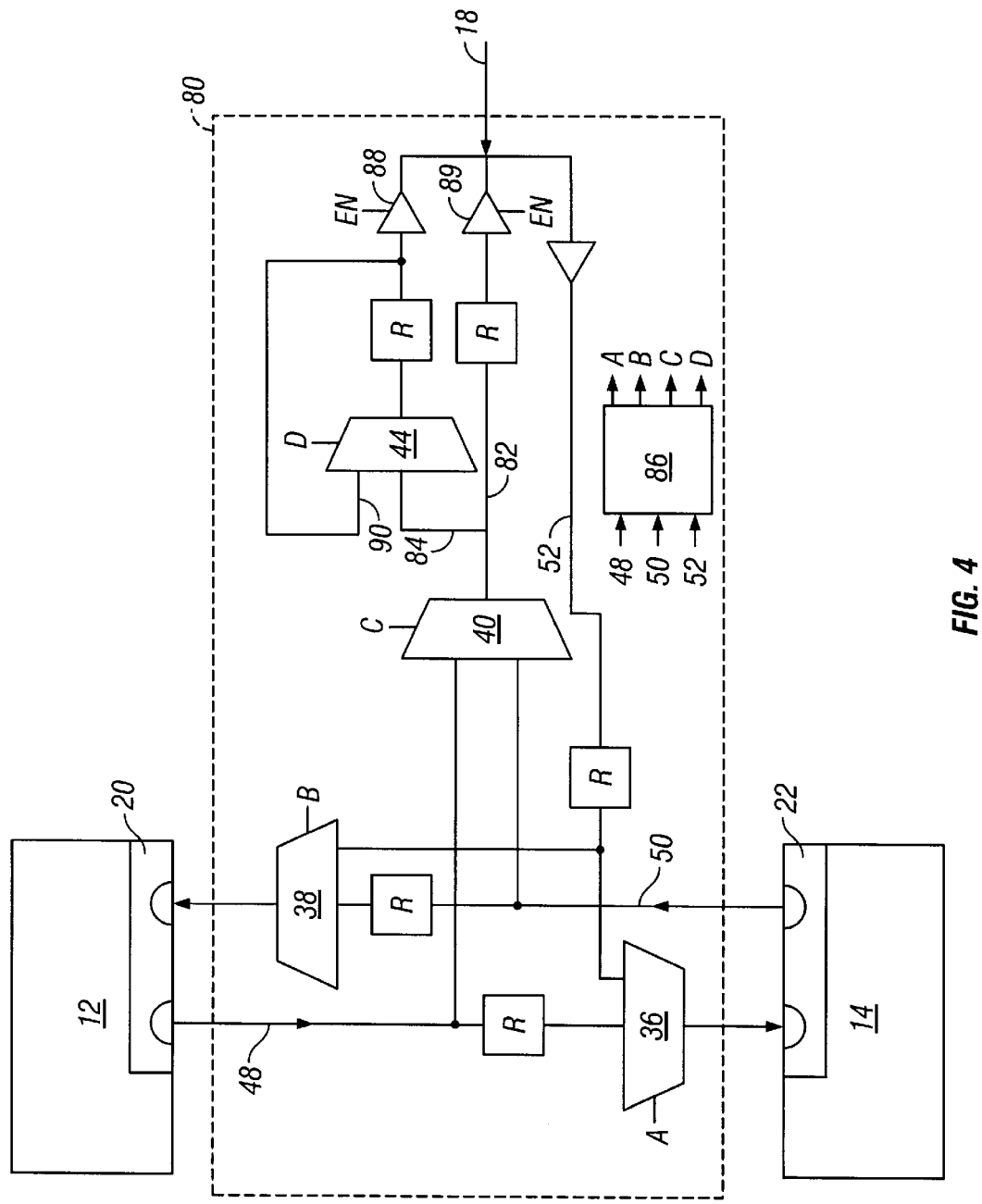
FIG. 4 shows an alternate embodiment of the shared port of FIG. 1.

FIG. 4 shows an alternate embodiment 80 of the shared port 16 of FIG.1. The port 80 broadcasts to the external bus 18 control and address portions of all bus formatted messages from the circuits 12, 14. The port 80 does not broadcast to the external bus 18 data portions of messages that have destinations in the circuits 12, 14. The port 50 consumes less power by not toggling bus lines to transmit the data portions of messages between the internal circuits 12, 14.

In the port 80, line 82 and line 84 carry respective control portions and address/data portions of bus formatted messages from the circuits 12, 14. The control portion of all messages is broadcast to the external bus 18 via line 82. For the PCI protocol, the control portion includes FRAME#, IRDY#, TRDY#, DEVSEL#, and STOP# signals. The address and data portions are broadcast to the external bus 18 via the line 84 and the MUX 44 if the destination address does not belong to the circuits 12, 14. For the PCI protocol, the address and data portions of the messages include signals transmitted by AD[31:0], C/BE[3:0]#, and PAR pins of the PCI bus.

In the port 80, message routing is controlled by enable signals from the circuits 12, 14 and by control signals from a control module 86.

Digital signals activate or deactivate the output drivers 88, 89 to transmit signals to the external bus 18. The output drivers 88, 89 receive these signals at enable terminals EN. The activating and deactivating signals are formed by logically ORing the activating/deactivating signals produced by the interface 20, 22 of the circuits 12, 14. Thus, the output drivers 88, 89 are activated if either circuit 12, 14 transmits a signal enabling message transmission.

The control signals control message routing by the MUXes 36, 38, 40 in a manner similar to the signals from the control module 46 shown in FIG. 2. But, the control signals are produced by the control module 86, which lacks address decode hardware and consequently does not decode destination addresses on the lines 48, 50, 52. Instead the control module 86 sends detected bus formatted messages to each potential destination aid monitors for message acceptance signals on the lines 48, 50, 52. From the identity of the lines 48, 50, 52 providing the acceptance signals, the control module 86 determines how to route the messages.

Figure 5:
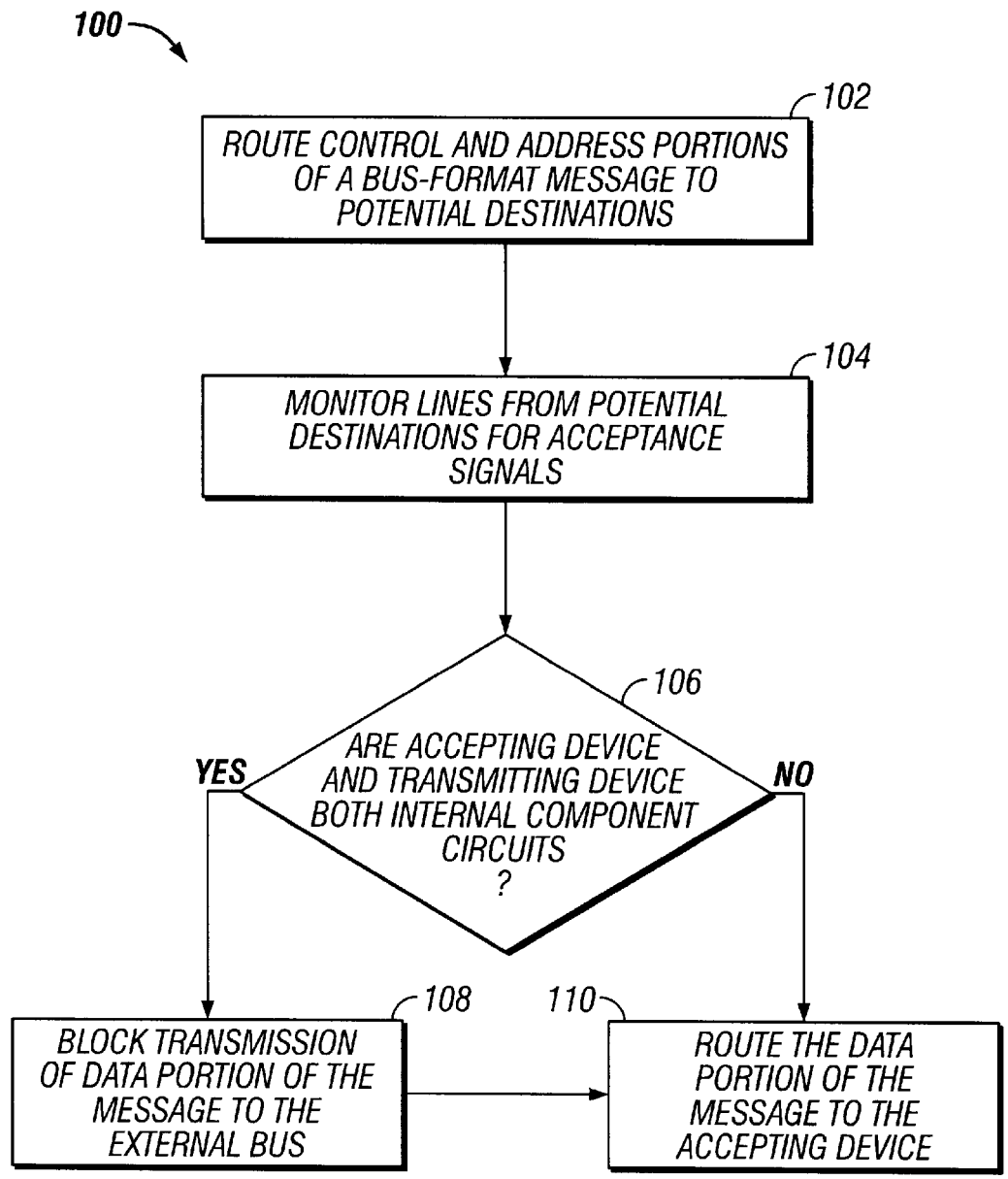
FIG. 5 is a flow chart showing a method of operating the shared port of FIG. 4.

FIG. 5 is a flow chart showing a method 100 of one embodiment for routing a bus formatted message with the port 80 of FIG. 4. The control and address portions of a detected message are routed to all potential targets by the control module 86 (step 102). For example, control and address portions of a message from the circuit 12 are routed to both the circuit 14 and to the external bus 18. Similarly, control and address portions of a message from the external bus 18 would be routed to both internal circuits 12, 14.

Initial routing of control and address portions of the message is performed by sending select signals to the MUXes 36, 38, 40, 44. The values of the select signals are determined by the identity of the line 48, 50, or 52 on which control portions of a message were detected. The control module 86 monitors the lines 48, 50, 52 for messages and sends the select signals to select terminals A, B, C, and/or D.

After routing the control and address portions of the message to the potential destinations, the control module 86 monitors the lines 48, 50, and 52 for message acceptance signals (step 104). One of the lines 48, 50, 52 may transmit an acceptance signal from the actual destination device. The actual destination device generates the acceptance signal in response to internal address decoding, which determines that the destination address matches one of its internal addresses.

If none of the lines generates an acceptance signal, the control module 86 assumes that the destination is the external bus 18. Some busses do not generate acceptance signals in response to specific errors.

The control module 86 determines whether both transmitting and accepting devices are the internal circuits 12, 14 (step 106). Both transmitting and accepting devices are internal circuits 12, 14 if both the transmission and acceptance signals come from the lines 48 and 50. Thus, this determination does not require decoding of the address portion of the message in the port 80.

If both the transmitting and accepting devices are internal circuits 12, 14, the control module 86 blocks transmission of data portions of the message to the external bus 18 (step 108). In response to the acceptance signal, the control module 86 also routes the data portion of the message to the accepting device (step 110).

To block transmission to the external bus 18, the control module signals terminal D to select feedback loop 90 as an input line for the MUX 44. While the feedback loop 90 is selected, MUX 44 broadcasts the previously broadcast signal, e.g., the address signal, to the external bus 18. The control module 86 continues to signal the MUX 44 to select the feedback loop 90 while the data portion of the message is being transmitted between circuits 12, 14. Then, the signal from the output driver 88 remains the same as long as the data portion is being transmitted. Broadcasting the same signal reduces power consumption, because the output driver 88 does not toggle the lines of the external bus 18.

Figure 6:
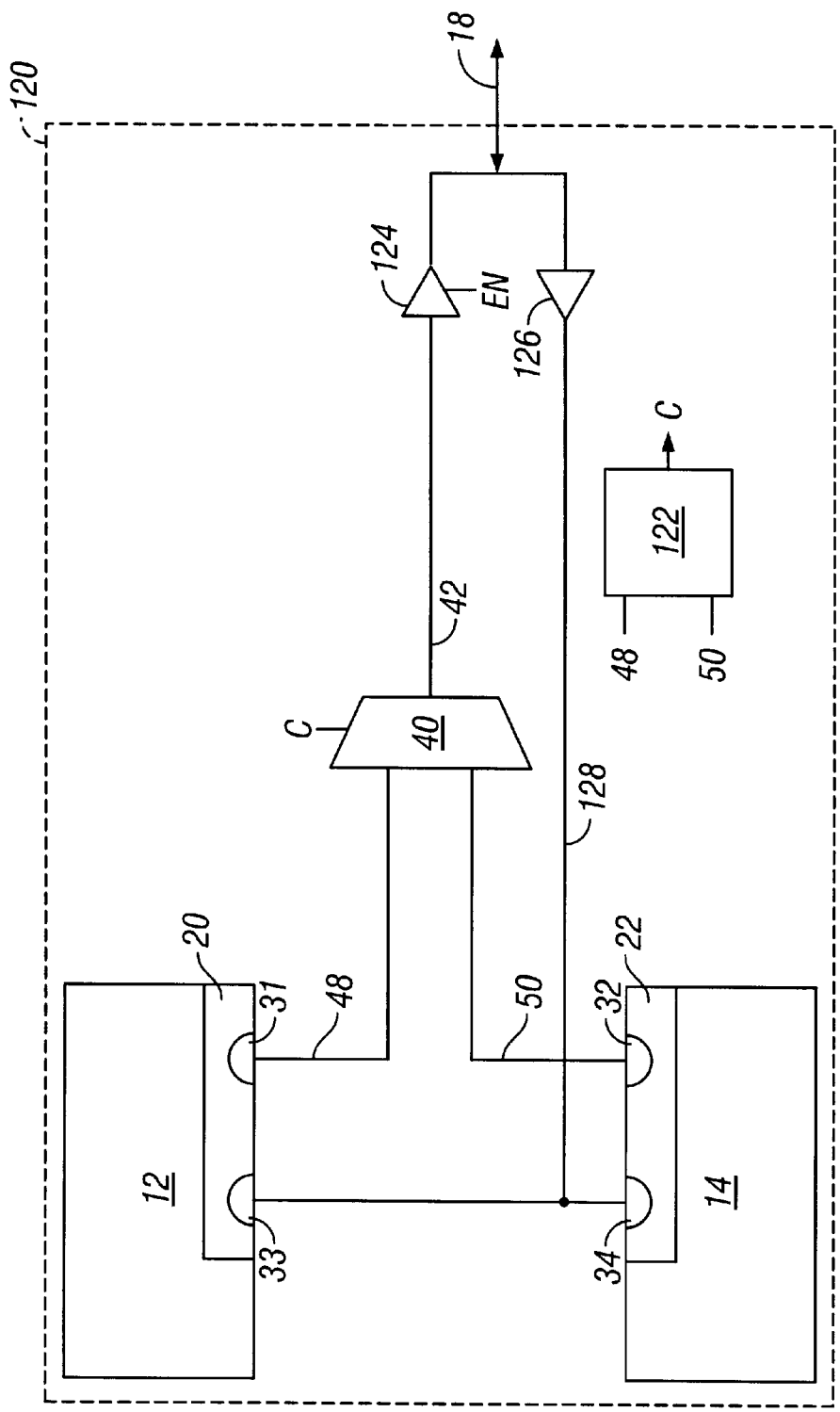
FIG. 6 shows another integrated circuit in which two circuits share a port on a bus.

FIG. 6 shows an alternate integrated chip 120 in which the circuits 12, 14 share a port to the external bus 18. The chip 120 includes a control module 122 that monitors lines 48, 50 for outgoing bus formatted messages. If an outgoing message is detected, the control module 122 sends a signal to the terminal C of the MUX 40 so that the line 48, 50 sending the message is connected to output driver 124. The output driver 124 broadcasts the message on the external bus 18 in response to an enable signal received at t terminal EN. As described above, the signal received by the terminal EN is the logical OR of activation/deactivation signals produced by each interface 20, 22.

In the chip 120, each bus formatted message from the circuits 12, 14 is broadcast on the external bus 18. Similarly, each message received from the external bus is sent to the interface 20, 22 of both circuits 12, 14 by amplifier 126 and line 128.

In the chip 120, each internally generated bus formatted message is broadcast to the external bus 18, i.e., even messages having the other internal circuit 12, 14 as destination are broadcast to the bus 18. Thus, the chip 120 does not conserve power by not broadcasting a portion of the bus cycles to the external bus 18. Nevertheless, the circuits 12, 14 do share the same output driver 124 and reception amplifier 126. Sharing these devices lowers engineering, construction, and/or product costs for the chip 120.

Figure 7:
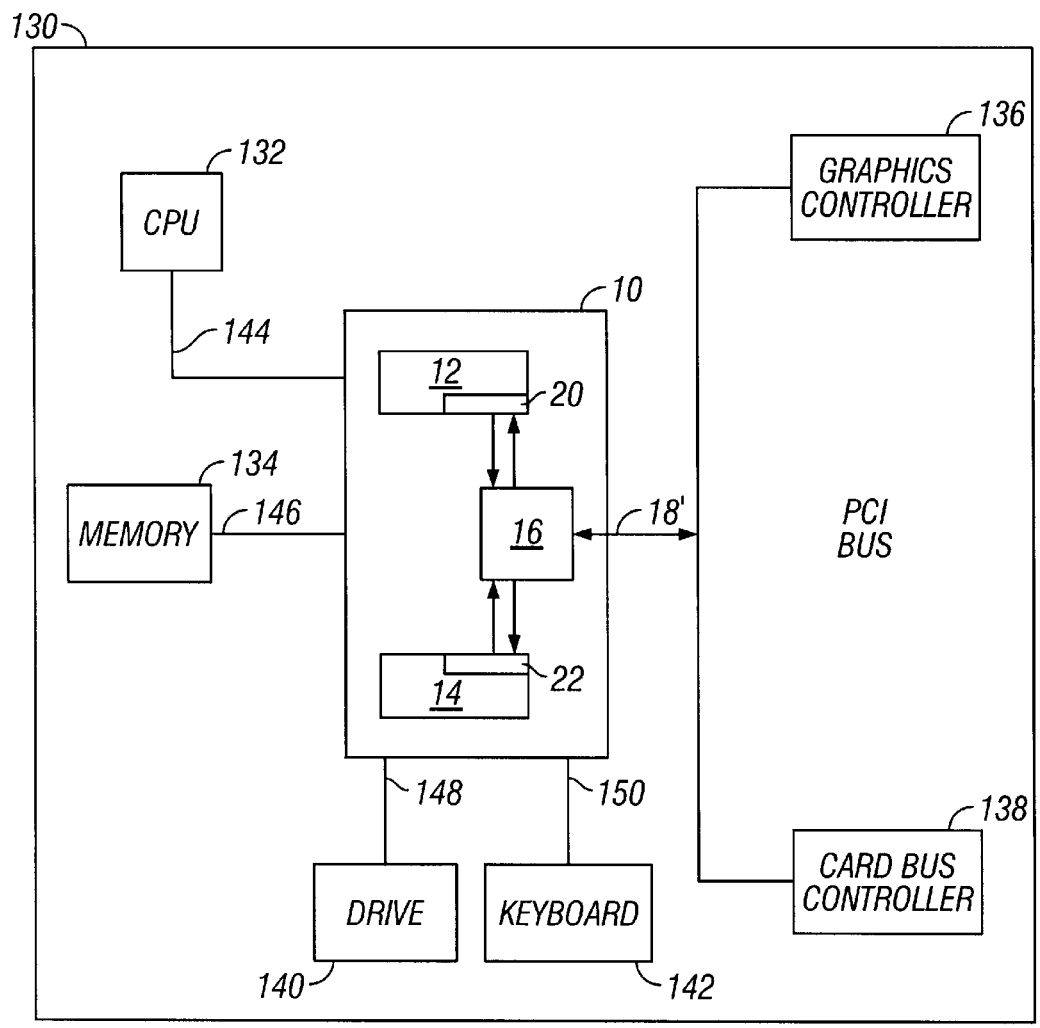
FIG. 7 shows a computer using the chip of FIG. 1.

FIG. 7 is a block diagram of a computer 130 that uses the chip 10 of FIG. 1 or another embodiment as a bridge between internal busses 144, 146 and the external bus 18'. The computer 130 includes a central processing unit (CPU) 132, a memory 134, a graphics controller 136, a cardbus controller 138, a hard or CDROM drive 140, and a keyboard 142. The graphics and cardbus controllers 136, 138 connect to the external bus 18', i.e., a PCI bus, which is bridged to busses 144, 146 via the chip 10. The busses 144 and 146 connect to the CPU 132 and the memory 134, respectively.

The two circuits 12, 14 are controllers of operations between the internal busses 144, 146, 148, 150 and between the internal busses 144, 146, 148, 150 and the external bus 18'. In-some embodiments, the circuit 12 is a north bridge that controls transactions between the CPU 132, the memory 134, and the PCI and internal busses 18', 148, 150. In these embodiments, the circuit 14 is a south bridge that controls transactions between peripherals such as the hard or CDROM drive 140 and keyboard 142 and the PCI and internal busses 18', 144, 146.

Other aspects, advantages, and modifications are within the scope of the following claims.

What is claimed is:

1. An apparatus, comprising:
   at least two digital circuits having interfaces to transmit and receive bus formatted messages; and
   a port coupled to transmit and receive messages to and from the interfaces and configured to broadcast to a bus a first received message that is not destined for one of the circuits and to block a second received message that is destined for one of the circuits from being broadcast to the bus, wherein the port further comprises:
   a control module coupled to detect message acceptance signals from a first one of the interfaces and to block broadcast of a portion of a message to the bus in response to determining from said message acceptance signals that the accepted message is from a second one of the interfaces.

2. The apparatus of claim 1, wherein the port further comprises:
   a controller coupled to receive address portions of messages and to cause one of the multiplexers to transmit a particular message directly between two of the interfaces in response to determining that source and destination of the particular message are the two of the circuits.

3. The apparatus of claim 1, wherein the port further comprises:
   a controller coupled to receive address portions of bus formatted messages and to block broadcast of a particular message to the bus in response to determining that the particular message has two of the circuits as source and destination.

4. The apparatus of claim 1, the interfaces support transmission and receipt of messages according to the PCI protocol.

5. An apparatus, comprising:
   at least two digital circuits having interfaces to transmit and receive bus formatted messages; and
   a port coupled to transmit and receive messages to and from the interfaces and configured to broadcast to a bus a first received message that is not destined for one of the circuits and to block a second received message that is destined for one of the circuits from being broadcast to the bus, wherein the port further comprises:
   a controller coupled to detect acceptance signals from the interfaces and to block broadcast to the bus of data portions of a message in response to detecting one of the acceptance signals.

6. An apparatus, comprising:
   at least two digital circuits having interfaces to transmit and receive bus formatted messages;
   a port coupled to transmit and receive messages to and from the interfaces and configured to broadcast to a bus a first received message that is not destined for one of the circuits and to block a second received message that is destined for one of the circuits from being broadcast to the bus, wherein the port further comprises:
   a control module coupled to detect message acceptance signals from a first one of the interfaces and to block broadcast of a portion of a message to the bus in response to determining from said message acceptance signals that the accepted message is from a second one of the interfaces;
   wherein the port further comprises a controller coupled to receive address portions of but formatted messages and to block broadcast of a particular message to the bus in response to determining that the particular message has two of the circuits as source and destination; and
   wherein the controller blocks broadcast of the particular message in response to the destination of the particular message belonging to a preselected proper subset of addresses in the circuits.

7. A method of transmitting bus formatted messages on a shared port that serves a bus, comprising:
   detecting a bus formatted message that is transmitted to the port and is destined for a preselected circuit that shares the port; and
   blocking transmission of the message to the bus, wherein the blocking is responsive to transmission of a message acceptance signal by the preselected circuit.

8. The system of claim 7, wherein the port further comprises:

a controller coupled to receive address portions of bus formatted messages and to cause one of the multiplexers to transmit a particular message directly between the interfaces in response to determining that a destination of the particular message is one of the circuits.

9. A digital electronic system, comprising:

a bus coupling hardware devices and supporting a communication protocol; and first and second digital circuits, each circuit having an interface that supports transmission and reception of messages according to the protocol; and a port coupling the circuits and bus for transmission and reception of messages according to the protocol, the circuits sharing the port, wherein the port further comprises:

a control module coupled to detect message acceptance signals from the circuits and to block broadcast of an accepted message to the bus in response to the message acceptance signal indicating that the accepted message being from another of the circuits.

10. The system of claim 9, wherein the control module blocks broadcasts of data portions of the accepted message.

11. The system of claim 9, wherein the port further comprises:

a controller coupled to receive address portions of bus formatted messages and to block broadcast of a particular message to the bus in response to determining that the particular message has two of the circuits as source and destination.

12. A digital electronic system, comprising:

a bus coupling hardware devices and supporting a communication protocol;

first and second digital circuits, each circuit having an interface that supports transmission and reception of messages according to the protocol;

a port coupling the circuits and bus for transmission and reception of messages according to the protocol, the circuits sharing the port, wherein the port further comprises:

a control module coupled to detect message acceptance signals from the circuits and to block broadcast of an accepted message to the bus in response to the message acceptance signal indicating that the accepted message being from another of the circuits;

wherein the port further comprises a controller coupled to receive address portions of bus formatted messages and to block broadcast of a particular message to the bus in response to determining that the particular message has two of the circuits as source and destination; and wherein the controller blocks broadcast of the particular message in response to the destination of the particular message belonging to a preselected proper subset of addresses of the circuits.

13. A computer, comprising;

a bus being connected to input/output devices and supporting a protocol;

a bridge having a port being connected to the bus and having at least two circuits each with an interface supporting the protocol, the interfaces being connected to transmit messages to the port, and the port to broadcast to a bus a first received message that is not destined for one of the circuits and to block broadcast to the bus a second received message that is destined for one of the circuits;

a memory coupled to the bus by the bridge; and a central processing unit coupled to the bridge, wherein the port further comprises:

a control module coupled to detect message acceptance signals from a first one of the interfaces and to block broadcast of an accepted message to the bus in response to determining, based on the message acceptance signal, that the accepted message is from a second one of the interfaces.

* * * * *